United States Patent

Hamerl

[11] Patent Number: 4,657,276
[45] Date of Patent: Apr. 14, 1987

[54] TRAILER HITCH

[76] Inventor: Arthur J. Hamerl, 15, 6440-4th Street, NW., Calgary, Alberta, Canada, T2K 1B8

[21] Appl. No.: 766,434

[22] Filed: Aug. 16, 1985

[30] Foreign Application Priority Data

Apr. 19, 1985 [CA] Canada .................. 479544

[51] Int. Cl.$^4$ .................................. B60D 1/06
[52] U.S. Cl. .................. 280/512; 280/478 B
[58] Field of Search ............ 280/511, 512, 513, 478 B

[56] References Cited

U.S. PATENT DOCUMENTS

| 2,078,851 | 4/1937 | Hovey | 280/511 |
|---|---|---|---|
| 2,385,596 | 9/1945 | Yager et al. | 280/511 |
| 2,693,970 | 11/1954 | Coleman et al. | 280/511 |
| 2,723,866 | 11/1955 | Hollingsworth | 280/511 |
| 2,847,234 | 8/1958 | Clark | 280/511 |
| 2,855,222 | 10/1958 | Bolmes et al. | 280/511 |
| 3,061,334 | 10/1962 | Everett et al. | 280/511 |
| 3,446,520 | 5/1969 | Gibson et al. | 280/512 |
| 3,679,243 | 7/1972 | Hamerl | 280/511 |
| 4,018,453 | 4/1977 | Bigelow | 280/511 |
| 4,209,184 | 6/1980 | Byers | 280/511 |
| 4,320,907 | 3/1982 | Eaton | 280/511 |

FOREIGN PATENT DOCUMENTS

| 297158 | 2/1930 | Canada . |
|---|---|---|
| 395681 | 4/1941 | Canada . |
| 952934 | 8/1974 | Canada . |
| 983067 | 2/1976 | Canada . |
| 1105518 | 7/1981 | Canada . |

OTHER PUBLICATIONS

Sunday Tab, Apr. 8, 1979, p. 33, "Family Living", Linda Curtis, Editor.
Wagonsnagger; Automatic Wagon Hitch; Canada.

Primary Examiner—John J. Love
Assistant Examiner—Donn McGiehan
Attorney, Agent, or Firm—Russel S. Smart

[57] ABSTRACT

A coupling assembly for coupling a tractor to a drawn vehicle or implement comprises a coupling body for attachment to one of a tractor drawbar or trailer tongue, and for engagement with a ball secured to the other of said tractor drawbar or trailer tongue, the body defining ramp means for guiding a ball into a socket forming part of the body, a movable element for locking a ball in said socket, movable second ramp means for guiding a ball out of the socket, and means for operating the movable element and second ramp means between a locking position in which the ball is held in the socket and a release position in which the ball is free to move out of the socket up the second ramp means.

4 Claims, 5 Drawing Figures

TRAILER HITCH

BACKGROUND OF THE INVENTION

This invention relates to coupling assemblies for connecting a tractor to a trailer or farm implement.

In prior Canadian patent No. 833,429, dated Feb. 3rd, 1970, and granted to the applicant herein, there is disclosed a coupling assembly comprising a body having an upwardly and forwardly inclined opening formed therein and adapted to receive a ball, the ball forming part of a trailer hitch assembly, the body having a sloping, longitudinally extending ramp or runway formed on the rear portion thereof and adapted to facilitate vertical and horizontal alignment of the ball with the mouth of the opening during coupling of the ball with the body, and means associated with the body to prevent unintentional disengagement of the ball from the body.

The coupling assembly described in the aforementioned patent is intended for heavy duty use, for example, for coupling a heavy agricultural implement to a tractor. While the coupling assembly described in the above patent is effective, it nonetheless requires a number of manual operations for successful operation, so that, for example, the operator of the machinery has to physically remove a ball on a trailer tongue from the coupling assembly. The present invention seeks to improve on the arrangement disclosed in the above prior patent by providing for substantially automatic coupling and decoupling of a trailer and a tractor, especially useful in situations where the implements and the parts thereof are heavy and difficult for a person to manipulate without mechanical assistance.

SUMMARY OF THE INVENTION

Accordingly, the present invention provides a trailer coupling of the type comprising means for receiving, and locking in place, a ball secured to one of a trailer tongue and a drawbar of a tractor vehicle or the like, the trailer coupling comprising;

a coupling body having a first body portion for attachment to the drawbar of a tractor or the tongue of a trailer, and a second body portion for locking the ball in position;

the second body portion including a ramp up which the ball may be guided, and a socket, for receiving the ball, adjacent the ramp;

the socket comprising a first socket portion integral with the body, and a movable element, swingable about a horizontal pivot, disposed within the body opposite the first socket portion, the movable element being swingable between a locking position in which, together with the first socket portion, the ball may be locked in position, and a release position in which the ball may ride out of the socket; and locking means within the body for selectively releasably locking the movable element in either of the locking and release positions.

Preferably, a second ramp is formed integrally with the movable element, whereby when the latter is in its release position the ball may ride out of the socket and up the second ramp. Thus, when the tractor is coupled to the trailer, the operator of the tractor may, by remote control, release the locking means, back the tractor up a few inches, whereby the movable element is rotated to the release position, operate the locking means to lock the movable element in the release position, and drive the tractor away with the ball on the trailer tongue riding up the second ramp, down the first ramp and free of the coupling.

Positioning of the tractor and trailer tongue for automatic engagement of the coupling device with the ball on the trailer may be facilitated by using a jack of the type disclosed in prior Canadian Pat. No. 1,028,310 dated Mar. 21st, 1978 and granted to the applicant herein. Thus the trailer tongue and its associated ball may be disposed, with the aid of the jack, at the proper level, and the tractor subsequently maneuvered into position so that the ball is opposite the ramp. The tractor may continue to reverse so that the ball rides up the first ramp and drops into the socket. The locking means is then manipulated so that the movable element falls into the locking position and is locked by operation of the locking means. Thus, in the entire operation of the assembly of the present invention, the tractor driver needs to dismount from his vehicle only once. This is when he has to dispose the trailer tongue at the right level for engagement with the first ramp. This can be done, as mentioned, with the jacking device of prior patent No. 1,028,310. When he has disposed the tongue and thus the ball at the right level, coupling of the tractor to the implement, and release of the tractor from the implement, can be achieved without the tractor operator having to leave his vehicle. He can thus successfully couple a heavy vehicle or farm implement to the tractor and uncouple the implement from the tractor with relative ease.

DETAILED DESCRIPTION OF THE PREFERRED EMBODIMENT

Figure 1:
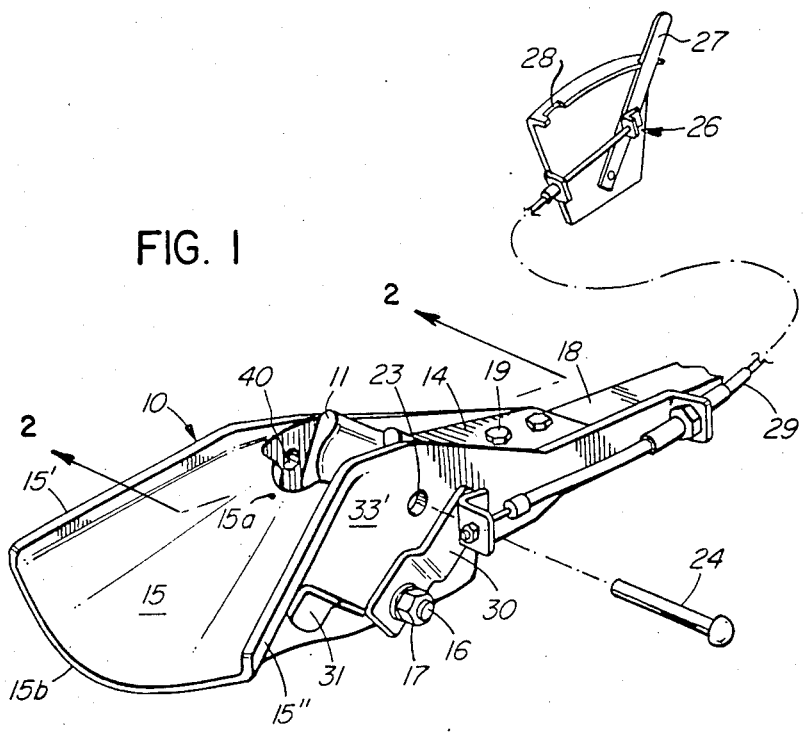
FIG. 1 is a perspective view of the apparatus.

Referring first to FIG. 1, there is illustrated a coupling body 10 which preferably is formed of cast metal, typically iron, and which comprises a first portion 14 for attachment to the drawbar 18 of a tractor (not shown), for example by bolts 19; the manner in which such couplings are attached to tractors, trailers or farm implements is well known and will not be discussed in detail here. It should be understood that while the invention is described in the context of this specification as secured to the drawbar of a tractor, with a downwardly depending ball secured to the tongue of a trailer or farm implement, the positions of the coupling and the ball can be reversed and, furthermore, the coupling can be operated upside down, secured to the tongue, in certain situations. If secured to the trailer tongue, access to the lower take-off link of the tractor is facilitated. The preferred way in which the invention is used is with the coupling 10 attached to the drawbar 18 of a tractor, and it is in this context that the invention will be described.

Opposite the first portion 14 of the body 10 is a ramp 15 which, at its outer end 15b, is wide and flared outwardly for reasons that will be described below. The ramp 15 narrows to a narrow portion 15a. The ramp also comprises side walls 15' and 15" for guiding a ball 25 up the ramp 15 and into the socket 40.

Figure 4:
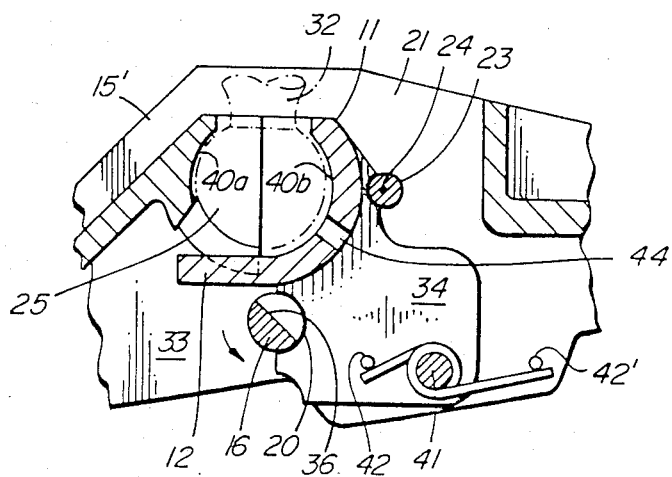
FIG. 4 is an illustration of the second portion of the socket in the locking position with the ball in place and with the locking means moving into the locking position.
Figure 5:
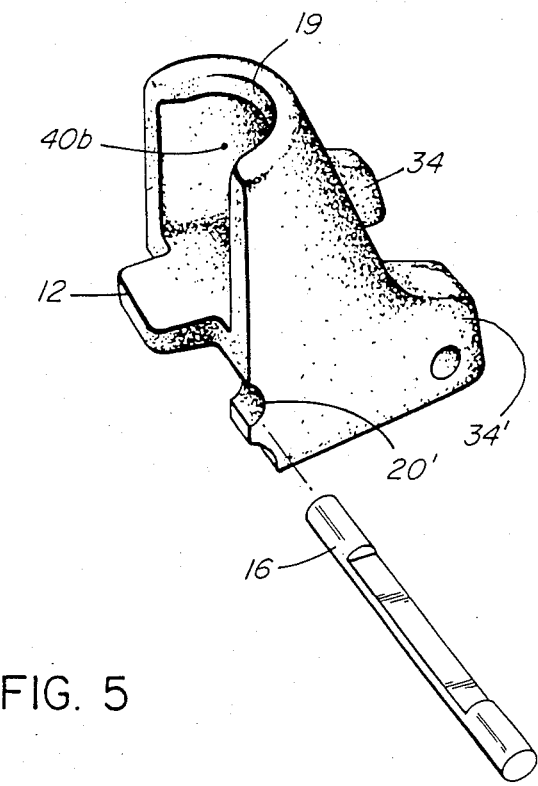
FIG. 5 is an illustration, in perspective, of the movable element.

The socket 40 comprises a portion 40a (FIG. 2) that is integral with the body 10, and a portion 40b which forms part of a movable element 11. 18 identifies a recess to receive neck 32 of ball 25. The element 11 is also preferably formed of cast hardened metal such as iron. As can be seen in FIG. 4, when the element 11 of the socket is in the locked position the portions 40a and 40b together define the part-spherical socket 40 that embraces, and locks in position, a ball 25. As can be seen in FIG. 5, the element 11 comprises the socket portion 40b, second ramp 12, a pair of downwardly extending flanges 34, 34', in front of which are machined notches 20, 20' for engagement with locking shaft 16, and a recess 19 to receive the neck 32 of the ball 25. The latter is secured to the tongue 35 so that it extends downwardly. Hole 44 in element 11 permits drainage of water from socket portion 40b. Also, the through opening 21 permits flushing of the apparatus in the event that mud or other dirt accumulates on the working parts. However, the simplicity of construction of the apparatus makes it essentially self-cleaning.

Figure 2:
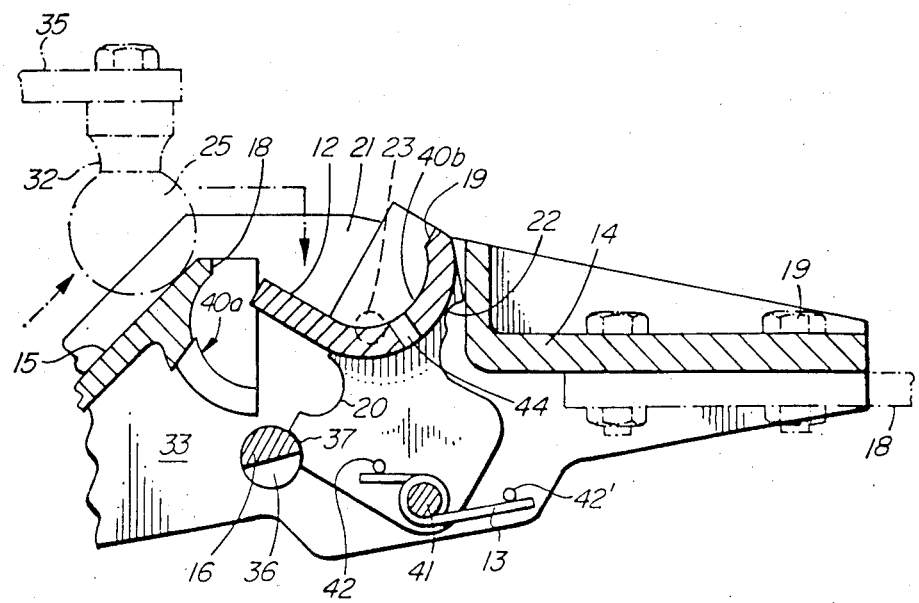
FIG. 2 is a section on the line 2—2 in FIG. 1, illustrating the elements of the device.
Figure 3:
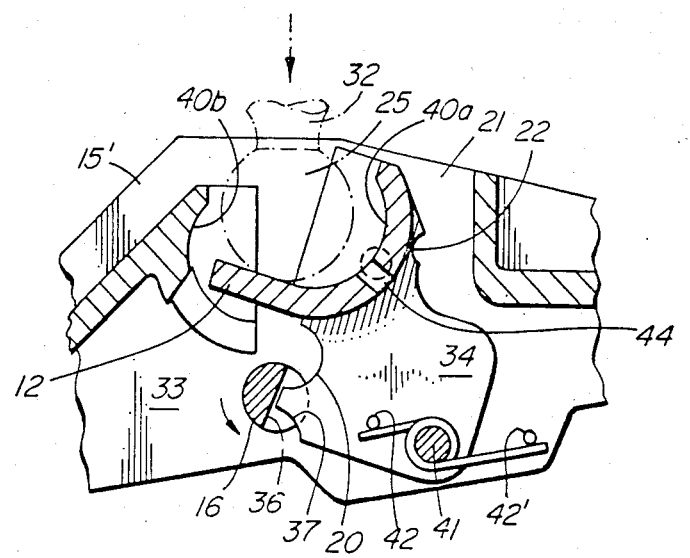
FIG. 3 is an illustration of the operation of the second portion of the socket and its associated locking means.

The element 11 is disposed in a through opening 21 in the body 10 as can clearly be seen in FIGS. 2, 3 and 4. A transversely extending shaft 41 is mounted in the body and provides a pivot for the element 11. Pins 42, 42' are mounted, respectively, on the element 11 and the body 10, and a torsion spring 13 is disposed about the shaft 41 and engages the pins 42, 42' to bias the element 11 toward the release position shown in FIG. 2.

A shaft 16 is also journalled in the opposite sides 33, 33' of the body 10. As will be seen in FIGS. 2, 3 and 4 the shaft 16, for most of its length, has a semi-cylindrical cross-section. It is secured by a bolt 17 to a lever 30 (FIG. 1), the latter being coupled in a manner known in the art to a Bowden cable 29. The latter is operable by a lever 27, which may be mounted on the tractor. The lever 27 is engagable in notches 28 in a quadrant plate 26, with the notches corresponding to the locking position and the release position of the shaft 16.

In use, with the body portion 14 secured to a tractor drawbar 18, the tongue 35 of a trailer on which there is mounted the downwardly depending ball 25 is elevated to the correct height in relation to the ramp 15, for example, by a jacking device as disclosed in the prior patent No. 1,028,310. Any other suitable jacking means may be used to dispose the trailer tongue at the correct level. Then, the operator of the tractor, by manipulation of the lever 27, rotates the shaft 16 so that the flat portion 36 is in the position shown in FIG. 3, i.e., free of the notches 20, 20' in the element 11. The spring 13 causes the element 11 to move upwardly to the position shown in FIG. 2. Then, the tractor operator may move the tractor so that the ramp 15 and the ball 25 are opposite, the ball 25 rides up the ramp 15 and falls into the socket 40. With the shaft 16 in the position shown in FIG. 3, the element 11 immediately drops to the position shown in FIG. 4, where the ball 25 is completely embraced by the socket 40 defined by portions 40a and 40b. The tractor operator may then, by manipulation of the lever 27, rotate the shaft 16 to engage the notches 20, 20' and lock the element 11 in the locking position. The tractor and the implement may then be driven away and safely operated until it is desired to remove the implement from the tractor. If highway use is contemplated, a pin 24 (FIG. 1) may be inserted through the holes 23 to engage with portion 22 of the element 11 to provide a measure of protection against possible accidental release of the element 11 from the locking position, indeed, such a safety device may be required for highway operations in some jurisdictions.

To release the implement from the tractor, the following sequence is followed. If the pin 24 is in place, it must first be removed. In normal farm use, however, the pin 24 will not be used. In order to release the tractor from the implement, the tractor operator first operates the lever 27 to rotate the shaft 16 to the position shown in FIG. 3. At this point, the shaft is out of engagement with the notches 20, 20'. He then backs up the tractor far enough, a few inches, so that the ball 25 rotates the element 11 to the position shown in FIG. 2. The shaft 16 is then rotated to the position shown in FIG. 2, in which downward movement of the element 11 is prevented by engagement of the shaft 16 by stop 37 of element 11. This disposes the second ramp 12 opposite the innermost portion 15a of the ramp 15. Then, the tractor is driven forward, whereupon the ball 25 rides up the ramp 12, over the edge of the ramp 15, and down the ramp 15 and thus free of the coupling device. It will be appreciated that unless the pin 24 is in position the whole of the release operation can be carried out without the tractor operator having to leave his seat. If the tongue of the implement is of considerable weight, a considerable time saving can be achieved and an attendant improvement in the safety factor of operation of this type of device.

While a Bowden cable and associated lever mechanism have been described and illustrated, it is feasible to operate the locking mechanism by electrical means or by other suitable mechanical or hydraulic means. Similarly, the pin 24 may be inserted into the holes 23 and retracted therefrom by electrical means as will be obvious to the person skilled in the art. The lever 30 may be constrained in its movement between the locking and release positions by stops, such as 31, secured to the side of the body 10.

It should be noted that to ensure freedom of movement of the ball and its associated tongue, the ball should be of the type having an elongated shaft so that at all times the tongue of the implement will not foul the body 10. Further, the size of the opening defined by the mouth of socket portions 40a, 40b should permit limited universal movement of the ball 25 in the socket 40.

I claim:

1. A trailer coupling of the type comprising means for receiving, and locking in place, a ball secured to one of a trailer tongue and a drawbar of a tractor vehicle or the like, the trailer coupling comprising;

a coupling body having a first body portion for attachment to the tractor drawbar or the trailer tongue, and a second body portion for receiving and locking the ball in position;

the second body portion including a ramp up which the ball may be guided, and a socket, for receiving the ball, adjacent the ramp;

the socket comprising a first socket portion integral with the body, and a movable element, swingable about a horizontal pivot, disposed within the body opposite the first socket portion;

the movable element being swingable between a locking position in which, together with the first socket portion, the ball may be locked in position, and a release position in which the ball may be released from the socket;

a second ramp formed integrally with the movable element and engageable by said ball for, when the movable element is in its release position, causing the ball to ride up said second ramp out of the socket;

and rotatable locking means within the body for selectively releasably locking the movable element in either of the locking and release position.

2. A coupling as defined in claim 1 wherein the rotatable locking means comprises a shaft journaled transversely in the coupling body adjacent the movable element, the shaft having a semi-cylindrical cross-section, the movable element having a pair of notch means formed therein for cooperation with the shaft, the shaft being rotatable to engage with one of said notch means or to be free of the respective notch means, said notch means being so located in the movable element that the shaft may be rotated to 3. A coupling as claimed in claim 1 or 2 including spring means biasing the movable element to the release position. engage one of the notch means and lock the movable element in the locking position or in the release position.

4. A coupling defined in claim 1 or 2 further including a safety lock comprising a pin disposable in holes one on each side of the coupling body and so positioned that said pin, when in place, will prevent the movable element from rotating from the locked position.

* * * * *